United States Patent

Christenson et al.

[11] Patent Number: 5,144,233
[45] Date of Patent: Sep. 1, 1992

[54] CRANKSHAFT ANGULAR POSITION VOLTAGE DEVELOPING APPARATUS HAVING ADAPTIVE CONTROL AND DIODE CONTROL

[75] Inventors: Rebecca A. Christenson, Kokomo; Brian K. Good, Greentown, both of Ind.

[73] Assignee: Delco Electronics Corporation, Kokomo, Ind.

[21] Appl. No.: 751,200

[22] Filed: Aug. 30, 1991

[51] Int. Cl.⁵ .......................... G01B 7/30; G01P 3/489
[52] U.S. Cl. .................................. 324/207.25; 328/31; 324/173
[58] Field of Search .................... 324/207.15, 207.25, 324/207.23, 173, 174, 166; 307/261, 268, 290; 328/12, 28, 31

[56] References Cited

U.S. PATENT DOCUMENTS

| | | | |
|---|---|---|---|
| 3,801,830 | 4/1974 | Boyer | 307/235 R |
| 3,826,985 | 7/1974 | Wiley | 324/173 |
| 4,095,179 | 6/1978 | Brenner et al. | 324/174 X |
| 4,107,603 | 8/1978 | Slough | 324/207.25 |
| 4,185,279 | 1/1980 | Bachman | 324/174 X |
| 4,529,932 | 7/1985 | Doueihi et al. | 324/174 X |
| 4,687,952 | 8/1987 | Capizzi, Jr. | 324/207.25 X |
| 4,868,498 | 9/1989 | Lusinchi et al. | 324/207.25 |
| 4,908,572 | 3/1990 | Sakai et al. | 324/173 |
| 5,015,949 | 5/1991 | Koch et al. | 324/207.25 |
| 5,029,286 | 7/1991 | Kirschner | 324/173 |

OTHER PUBLICATIONS

Long, "An Adaptive Sense Amplifier For Engine Control Applications", S.A.E. paper no. 770435, Feb. 28–Mar. 4, 1977, pp. 1–5.

Primary Examiner—Kenneth A. Wieder
Assistant Examiner—Warren S. Edmonds
Attorney, Agent, or Firm—Creighton R. Meland

[57] ABSTRACT

Apparatus for developing a series of square-wave pulses from an alternating voltage that is generated in the pick-up coil of a variable reluctance sensor that is associated with a slotted wheel that is driven by the crankshaft of an internal combustion engine. The system has an adaptive control which comprises a peak detector, a capacitor and a voltage comparator. The capacitor is charged to a peak voltage that corresponds to the peak value fo the positive half-cycles of the alternating voltage. The comparator is connected to compare the peak voltage and a voltage that corresponds to the magnitude of the positive half-cycles. A diode is connected between the pick-up coil and the peak detector which prevents charging of the capacitor and accordingly prevents adaptive control until the voltage induced in the pick-up coil is high enough to cause the diode to conduct in the forward direction.

5 Claims, 1 Drawing Sheet

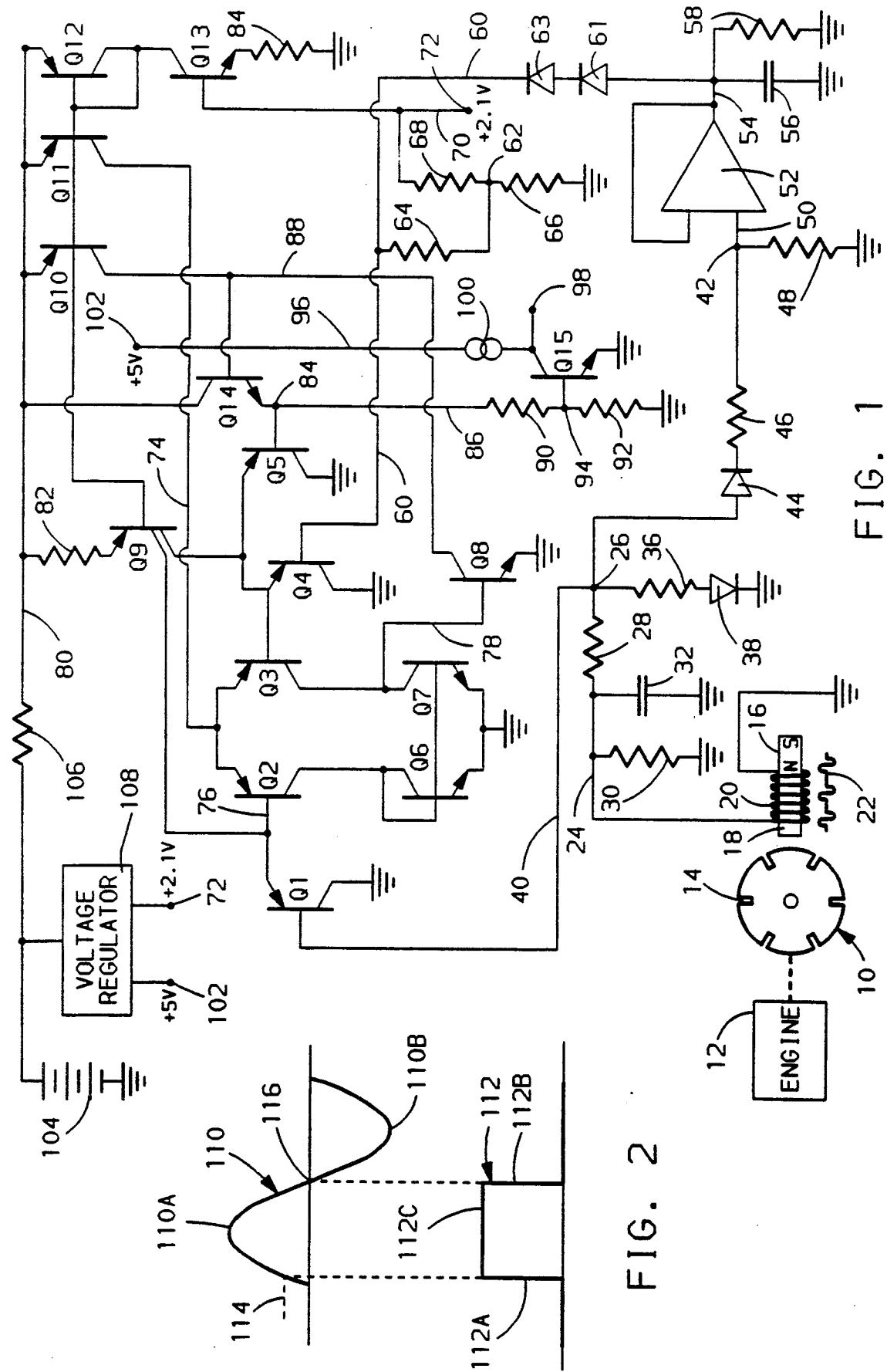

CRANKSHAFT ANGULAR POSITION VOLTAGE DEVELOPING APPARATUS HAVING ADAPTIVE CONTROL AND DIODE CONTROL

This invention relates to apparatus for developing square-wave pulses from an alternating voltage that is developed by a variable reluctance sensor that develops an alternating voltage as a wheel or disk having slots, that is driven by the crankshaft of an internal combustion engine, rotates past the sensor and, more particularly, to such an apparatus that has a new and improved adaptive control.

Systems for developing square-wave pulses as a function of the angular position of the crankshaft of an internal combustion engine are well known. In some of these systems a wheel which has a plurality of angularly spaced slots is driven by the crankshaft of an internal combustion engine. The wheel rotates past a variable reluctance sensor that has a pick-up coil. An alternating voltage is induced in the pick-up coil each time a slot in the wheel passes by the sensor. The alternating voltage is converted to a series of square-wave pulses which can be used as timing pulses for a digital electronic ignition system.

A problem associated with systems of the type described is that imperfections in the wheel may cause noise voltages to be induced in the pick-up coil which may be converted into false square-wave pulses. As one possible solution to this problem, so-called adaptive controls have been developed. In one known type of adaptive control, a capacitor is charged to the peak voltage developed in the pick-up coil by a peak detector. This peak voltage is then used as a threshold voltage for a voltage comparator and when the voltage induced in the pick-up coil has a certain relationship with the threshold voltage, the comparator switches states to cause a voltage transition that defines the leading edge of a square-wave pulse to be developed. The system is an adaptive system because it adapts to the fact that the peak amplitude of the voltage induced in the pick-up coil varies with changes in the speed of rotation of the engine driven wheel. Thus, the amplitude of the peak voltage increases as the speed of rotation of the wheel increases.

It is an object of this invention to provide a new and improved adaptive control for developing square-wave pulses from an alternating voltage developed by the pick-up coil of a variable reluctance sensor that is associated with a wheel that is driven at a variable speed by an internal combustion engine.

In accordance with one aspect of this invention, an adaptive control is provided which does not come into operation until engine speed exceeds some value. More specifically, the adaptive control includes a diode connected between the pick-up coil of the sensor and a peak detector for charging a capacitor. The control prevents energizing the peak detector from the alternating voltage induced in the pick-up coil until the voltage induced in the pick-up coil is high enough to forward bias the diode. In effect, the control prevents adaptive operation over a low speed range of the engine.

In accordance with another aspect of this invention, the voltage comparator, that is, part of the adaptive control, has three inputs and one output. The voltage of the first input is compared to the voltages of the second and third inputs. The first input is connected to the pick-up coil. The second input has a voltage, when engine speed is high enough to cause the diode to be forward biased, that is related to the voltage of the capacitor that has been charged by the peak detector. The third input has a low or high state which is dependent upon the switching state of the comparator.

IN THE DRAWINGS

FIG. 1 is a schematic circuit diagram of a system made in accordance with this invention;

FIG. 2 illustrates voltage waveforms that are useful i understanding this invention.

Referring to FIG. 1, reference numeral 10 designates a wheel that is driven by the crankshaft of an internal combustion engine 12. The wheel has six radially extending slots, each designated as 14, which are spaced from each other by sixty angular degrees. The number of slots and their angular spacing is given by way of example and the number of slots and their angular spacing can be varied to suit a particular application. Disposed adjacent the outer periphery of wheel 10 is a variable reluctance magnetic pick-up. This pick-up comprises a permanent magnet 16 and a core 18 is formed of magnetic material. A pick-up coil 20 is wound on core 18. As a slot 14 rotates past the end of core 18, an alternating voltage is induced or generated in pick-up coil 20. The voltage waveform generated in coil 20 is comprised of a series of alternating voltages as shown by the waveform 22. Waveform 22 shows three consecutively occurring alternating voltages which represents the passage of three slots past the end of the sensor. Each alternating voltage that is generated occur at predetermined angularly spaced positions of the engine crankshaft.

One side of coil 20 is grounded and its opposite side is connected to conductor 24. Conductor 24 is connected to a junction 26 through a 40K ohm resistor 28. A resistor 30 of 14K ohms and a 1000pf capacitor 32 are connected between conductor 24 and ground. A 16K ohm resistor 36 and a p-n junction semiconductor diode 38 are series connected between junction 26 and ground. Junction 26 is connected to conductor 40 which, in turn, is connected to one input of a voltage comparator that is described hereinafter.

Junction 26 is connected to a junction 42 through a p-n junction semiconductor diode 44 and a 15K ohm resistor 46. A 12K ohm resistor 48 is connected between junction 42 and ground. Junction 42 is connected to a conductor 50 which, in turn, is connected to the input of a peak detector to be described.

The peak voltage of the alternating voltage generated in coil 20 may go as high as 200 volts. The positive half-cycles of the alternating voltage is attenuated or scaled down by voltage divider circuits. Thus, the voltage at junction 26 and conductor 40 is scaled down by a voltage divider comprised of the 40K resistor 28 and the 16K resistor 36.

The voltage at junction 26 is further attenuated or scaled down by a voltage divider comprised of the 15K resistor 46 an 12K resistor 48. Assuming the resistor values just set forth, the voltage at junction 42 and conductor 50 will be about $12/_{12+15}$ or about 0.44 multiplied times the voltage at junction 26.

The system of this invention has a peak detector for detecting the peak alternating voltage on conductor 50. This peak detector comprises a unity gain amplifier 52 having a input connected to conductor 50. The output of amplifier 52 is connected to a conductor 54. A capacitor 56 which may have a capacitance of about one microfarad is connected between conductor 54 and ground. A resistor 58, of about 500K ohms resistance is connected between conductor 54 and ground and therefore in parallel with capacitor 56. The conductor 54 is also connected to a conductor 60 through two series connected p-n junction semiconductor diodes 61 and 63.

During the positive half-cycles of the voltage generated in coil 22, the peak detector including amplifier 52 charges the capacitor 56 to substantially the peak positive voltage at junction 42 which will be about 0.44 times the peak voltage at junction 26. As the positive half-cycle now goes form its peak voltage towards zero the capacitor will discharge through the resistor 58. The peak detector may take the form of a voltage comparator.

The conductor 60 is one input to a voltage comparator which will be described. Conductor 60 is connected to a junction 62 through a 17K ohm resistor 64. A 2.4K ohm resistor 66 is connected between junction 62 and ground. A 19.2K ohm resistor 68 is connected between junction 62 and a conductor 70. The conductor 70 is connected to a junction or terminal 72 which has a positive direct voltage of about 2.1 volts applied thereto in a manner to be described.

The voltage at junction 62 from the positive 2.1 volts on line 70 will be about $(2.1) \times 2.4/_{19.2+2.4}$ or about 0.24 volts. The voltage on conductor 60 will be the voltage on capacitor 56 less the voltage drops across diodes 61 and 63. The voltage on conductor 60 therefore represents the peak positive peak voltage to which capacitor 56 has been charged less any voltage caused by the discharge of capacitor 56 through resistor 58.

The system of this invention has a voltage comparator which will now be described. The voltage comparator comprises a PNP transistors Q1, Q2, Q3, Q4 and Q5 and NPN transistors Q6 and Q7. The emitters Q2 and Q3 are connected together and to a conductor 74. The collector of Q2 is connected to the collector of transistor Q6 which is connected to form a diode. The collector of Q3 is connected to the collector of NPN transistor Q7. The emitters of Q6 and Q7 are connected together and to ground. The base electrodes of Q6 and Q7 are connected together. The base of Q2 is connected to the emitter of Q1 by conductor 76 and the collector of Q1 is grounded. The base of Q3 is connected to the emitters of Q4 and Q5. The collector of Q7 is connected to the base of an NPN transistor Q8 by conductor 78. The emitter of Q8 is grounded.

Conductor 76 is connected to one of the collectors of a PNP transistor Q9. The other collector of this transistor is connected to the emitters Q4 and Q5. The emitter of Q9 is connected to a power supply conductor 80 through a resistor 82. The base of Q9 is connected to the bases of PNP transistors Q10, Q11 and Q12. Q12 is connected as a diode and its collector is connected to the collector of an NPN transistor Q13. The emitter of Q13 is connected to ground through a 14K ohm resistor 84. Transistors Q9, Q10, Q11 and Q12 provide a current source function. Transistor Q13 is a current generator.

The base of Q5 is connected to a junction 84 on conductor 86. Conductor 86 is connected to the emitter of an NPN transistor Q14 and it can be seen that the base of Q5 is connected to the emitter of Q14. The collector of Q14 is connected to conductor 80. The base of Q14 is connected to the collector of Q8 through conductor 88. The base of Q14 and the collector of Q8 are connected to the collector of Q10.

The conductor 86 is connected in series with two 20K ohm resistors 90 and 92. The junction 94 of these resistors is connected to the base of an NPN transistor Q15. The emitter of Q15 is connected to ground. The collector of Q15 is connected to conductor 96 through a current source 100. Conductor 96 is connected to junction 102 which has a positive direct voltage of five volts applied thereto. The collector of Q15 is connected to an output terminal 98 for the system.

Transistor Q15 is part of an output circuit for the system that develops square-wave pulses on terminal 98 at certain angular positions of the crankshaft of the engine. When transistor Q15 is biased conductive, the voltage at terminal 98 is low or near ground potential. When transistor Q15 is biased nonconductive, the voltage at terminal 98 is high or, in other words, at a positive direct voltage level of about five volts higher than ground.

The power supply for the system will now be described. The system is powered by the twelve volt storage battery 104 on a motor vehicle. The negative side of battery 104 is connected to ground. The positive side of battery 104 is connected to conductor 80 through a resistor 106. The voltage on conductor 80 is about 12 volts.

The battery 104 feeds a voltage regulator 108 which has two outputs connected respectively to terminals 102 and 72. The regulator develops a positive direct voltage of five volts on terminal 102 and 2.1 volts on terminal 72. These voltage are applied to the system in a manner that has been described. In this regard, terminals designated by the same reference numeral are connected together.

Before proceeding to a detailed description of the operation of this invention, a general description of this operation will now be given with reference to FIG. 2. In FIG. 2, reference numeral 110 designates an alternating voltage that is induced in coil 20 as a slot 14 passes the sensor. This voltage has a positive half-cycle 110A and a negative half-cycle 110B. FIG. 2 also shows a square wave pulse 112 which has a leading rising edge 112A and a trailing falling edge 112B. Pulse 112 appears at terminal 98 and is caused by the on-off switching of transistor Q15. Also shown in FIG. 2 is a trigger or threshold voltage level shown as doted line 114. Level 114 corresponds to a voltage on capacitor 56 and represents peak voltage. This level 114 will vary depending upon the peak amplitude of alternating voltage 110. The waveforms of FIG. 2 are not to be taken as indicative of the actual magnitude or shapes of the voltages developed by the system of this invention but are generalized waveforms to aid in explaining the operation of this invention.

As an alternating voltage 110 is generated, the beginning of the positive half-cycle 110A increases in a positive direction and when it reaches the trigger or threshold level 114 the transistor Q15 is biased nonconductive to thereby cause the rising edge 112A of square-wave 112 to be developed. Square-wave 112 now remains at a high level 112C until the positive half-cycle 110A goes through zero at point 116. When this happens, transistor Q15 is biased conductive to cause the falling edge 112B of square-wave 112 to be developed. The falling edge 112B is used in digital ignition systems for timing purposes.

A detailed description of the operation of the system of this invention will now be described. The voltage comparator has three inputs namely, the bases, of Q1, Q4 and Q5 and an output 78 which controls the switching of Q8, Q14 and Q15. A high level voltage on line 78 causes Q8 to be biased on which, in turn, causes Q14 to be biased off and Q15 biased off. A low level voltage on line 78 causes Q8 to be biased off which, i turn, causes Q14 and Q15 to be biased on.

The comparator input at the base of Q1 has a voltage applied thereto from junction 26 and conductor 40 which is a scaled down version of the voltage induced in coil 22. This voltage at the base of Q1 is compared to the voltages respectively at the bases of Q4 and Q5. When the engine is running above a predetermined speed, the voltage at the base of Q4 will follow the voltage o capacitor 56. This capacitor voltage varies as a function of the peak amplitude of alternating voltage induced in coil 20. In general, the dotted line 114 in FIG. 2 represents the variable peak voltage attained by capacitor 56. When the voltage at the base of Q1 reaches a value that exceeds the peak-related voltage on the base of Q4, the voltage comparator switches to a state where the voltage on conductor 78 biases Q8 on. With Q8 biased on, Q14 and Q15 are biased off causing the rising edge of 112A in FIG. 2 to be developed.

When Q14 is biased off, as just described, the voltage at junction 84 drops from a positive value above ground to substantially ground potential. It drops to substantially ground potential due to the path to ground through resistors 90 and 92. This ground potential voltage is applied to the base of Q5 which is one of the comparator inputs. The voltage at the base of Q5 (ground potential) is now compared to the voltage at the base of Q1. When the voltage at Q1, which corresponds to the decreasing part of the positive half-cycle 110A shown in FIG. 2 drops to ground potential, the comparator switches to a state that causes Q8 to be biased off. With Q8 biased off, Q14 and Q15 are biased on causing the falling edge 112B (FIG. 2) to be developed. This happens at point 116 in FIG. 2 where the positive half-cycle of the alternating voltage crosses zero.

The description of the operation of the system of this invention, as thus far described, has assumed that engine speed is higher than a predetermined speed. At low engine speeds, a different mode of operation takes place which disables the peak detector 52 so that the system no longer operates in an adaptive manner or, putting it another way, the voltage at the base of Q4 no longer varies but remains substantially constant. In this regard, the p-n junction semiconductor diode 44 will not conduct in a forward direction (anode to cathode) until a voltage of about 700 millivolts is applied across it. At low engine speed, the peak voltage induced in coil 20 may be as low as 250 millivolts. When the voltage induced in coil 20 is below a value that will cause the forward conduction of diode 44 the peak detector 52 is not energized and capacitor 56 is not charged. Accordingly, there is no voltage applied to the base of Q4 that can be attributable to the voltage on capacitor 56 since it was not charged. Under this condition of operation the voltage at the base of Q4 will be substantially equal to the voltage at junction 62 which previously explained is about 0.24 volts. A fixed trigger or threshold voltage of about 0.24 volts at the base of Q4 is now compared with the voltage at the base of Q1 and when the voltage at the base of Q1 exceeds this fixed threshold voltage, the comparator switches state to cause the rising edge 112A of FIG. 2 to be developed. In effect, at low engine speeds the peak detector 52 has been disabled by diode 44. Putting it another way, adaptive control, including the charging of capacitor 56 does not start until the voltage induced in pick-up coil 20 is high enough to cause diode 44 to conduct in a forward direction.

The embodiments of the invention in which an exclusive property or privilege is claimed are defined as follows:

1. Apparatus for developing a series of square-wave pulses that are related to the angular position of the crankshaft of an internal combustion engine comprising, a variable reluctance sensor having a pick-up coil a wheel driven by said engine associated with said sensor having a plurality of slots, said pick-up coil having an alternating voltage induced therein as a said slot on the said wheel passes said sensor, a voltage comparator having at least first and second inputs and an output, said output being coupled to square-wave voltage developing means for developing said square-wave pulses, means connecting said pick-up coil to said first input of said comparator, a peak detector means, a capacitor, means connecting said peak detector means to said capacitor, means connecting said peak detector means to said pick-up coil operative to cause said capacitor to be charged to a voltage that is related to the peak voltage of said alternating voltage, means connected to said capacitor and to said second input of said comparator for applying a voltage to said second input of said comparator that is related to the voltage across said capacitor, said comparator switching its state to provide a voltage at its output that causes said square-wave voltage developing means to develop a voltage transition that defines the leading edge of a square-wave pulse when the voltage at said first input of said comparator attains a value related to the voltage at said second input of said comparator, means for preventing charging of said capacitor until the amplitude of said alternating voltage exceeds a predetermined value, said last named means comprising a diode connected between said pick-up coil and said peak detector means, and means for maintaining said voltage applied to said second input of said comparator at a fixed value when there is no voltage on said capacitor.

2. Apparatus for developing a series of square-wave pulses that are related to the angular position of the crankshaft of an internal combustion engine comprising, a variable reluctance sensor having a pick-up coil, a wheel driven by said engine associated with said sensor having a plurality of slots, said pick-up coil having an alternating voltage induced therein as a said slot passes said sensor during rotation of said wheel, a voltage comparator having first, second and third inputs and an output, said output being coupled to square-wave developing means for developing said square-wave pulses, means connecting said pick-up coil to said firs input of said comparator, a peak detector means, a capacitor, means connecting said peak detector means to said pick-up coil and to said capacitor operative to cause said capacitor to be charged to a voltage that is related to the peak voltage of said alternating voltage, means connected to said capacitor and to said second input of said comparator for applying a voltage to said second input of said comparator that is related to the voltage across said capacitor, means responsive to the voltage at the output of said comparator for applying a voltage to said third input of said comparator that has a high or low voltage level that depends on the switching state of the comparator, said comparator during the beginning of a positive half-cycle of said alternating voltage comparing the voltage at said first and second input terminals and causing said comparator to switch to a first state when said positive half-cycle voltage attains a value related to the voltage on said second input terminal of said comparator, said comparator when switched to said first state causing the voltage applied to said third input terminal of said comparator to assume said low state and causing said square-wave developing means to develop a first voltage transition that defines the leading edge of a square-wave pulse, said comparator thereafter comparing the voltages at said first and third input terminals of said comparator and causing said comparator to switch to a second state when said positive half-cycle voltage applied to said first input terminal crosses through said low level voltage that is applied to said third input terminal, said comparator when switched to said second state causing said square-wave developing means to develop a second voltage transition that defines the trailing edge of a square-wave pulse, and a diode connected between said pick-up coil and said peak detector means, said diode preventing said capacitor form being charged until the amplitude of said alternating voltage is high enough to cause said diode to conduct in a forward direction.

3. The apparatus according to claim 2 where said comparator switches to said second state when a positive half-cycle of said alternating voltage crosses through a zero level.

4. The apparatus according to claim 2 where said first voltage transition is a rising edge and where said second voltage transition is a falling edge.

5. The apparatus according to claim 2 where one side of said pick-up coil is connected to ground and where said low voltage level is substantially ground potential.

* * * * *